US011456616B2

(12) United States Patent
Kanarellis et al.

(10) Patent No.: US 11,456,616 B2
(45) Date of Patent: *Sep. 27, 2022

(54) SYSTEM AND METHOD FOR SUPPLYING UNINTERRUPTIBLE POWER TO A POE DEVICE WITH A POWER SUPPLY INPUT FOR SOLAR POWER

(71) Applicant: BTU RESEARCH LLC, Houston, TX (US)

(72) Inventors: Michael Kanarellis, Houston, TX (US); Charles I. McAndrew, Magnolia, TX (US); Kenny Swatzel, Montgomery, TX (US)

(73) Assignee: BTU RESEARCH LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,547

(22) Filed: Jan. 23, 2021

(65) Prior Publication Data

US 2021/0143670 A1 May 13, 2021

Related U.S. Application Data

(62) Division of application No. 16/252,365, filed on Jan. 18, 2019, now Pat. No. 10,916,965.

(51) Int. Cl.
*H04L 12/10* (2006.01)
*H02J 9/06* (2006.01)
*H02J 3/38* (2006.01)
*H02J 7/00* (2006.01)
*H02J 7/35* (2006.01)

(52) U.S. Cl.
CPC ............. *H02J 9/061* (2013.01); *H02J 3/38* (2013.01); *H02J 3/385* (2013.01); *H02J 7/0013* (2013.01); *H02J 7/35* (2013.01); *H04L 12/10* (2013.01)

(58) Field of Classification Search
CPC .... H02J 9/061; H02J 3/38; H02J 3/385; H02J 7/0013; H02J 7/35; H04L 12/10; Y02B 10/70; Y02B 70/30; Y02E 10/56; Y04S 20/20
See application file for complete search history.

(56) References Cited

U.S. PATENT DOCUMENTS

| 7,286,556 | B1 | 10/2007 | Jackson | |
| 9,256,263 | B1* | 2/2016 | Narayanan | ............ G06F 1/3243 |
| 9,735,618 | B2* | 8/2017 | Kanarellis | ............... H04L 12/10 |
| 10,218,215 | B2* | 2/2019 | Kanarellis | ................ H02J 9/00 |

(Continued)

*Primary Examiner* — Pinping Sun
(74) *Attorney, Agent, or Firm* — Craft Chu PLLC; Andrew W. Chu

(57) ABSTRACT

A system and method for supplying uninterruptible power includes a housing, a power supply input connected to a solar panel as a power supply, a main network input, a powered device output, an alternative power supply as a plurality of batteries, and a control module. The power supply input includes a controller and power distribution unit to manage the solar panel. The main network input and control module are also modified to include an adapter, a power management processor, and a network management processor. There can be a panel irradiance sensor on the solar panel and connected to the power management processor. The system can be located at a remote location with only the solar panel connected to the power supply input.

9 Claims, 2 Drawing Sheets

(56) References Cited

U.S. PATENT DOCUMENTS

| | | | |
|---|---|---|---|
| 10,218,216 B2* | 2/2019 | Kanarellis | H02J 7/007182 |
| 10,916,965 B2* | 2/2021 | Kanarellis | H02J 9/061 |
| 2008/0168283 A1* | 7/2008 | Penning | G06F 1/263 |
| | | | 713/310 |
| 2009/0243391 A1 | 10/2009 | Susong et al. | |
| 2011/0126032 A1* | 5/2011 | Khan | G06F 1/3209 |
| | | | 713/310 |
| 2012/0071011 A1* | 3/2012 | Kagan | H01R 31/065 |
| | | | 439/620.24 |
| 2012/0080944 A1 | 4/2012 | Recker et al. | |
| 2012/0242320 A1* | 9/2012 | Fischer | G01R 19/2513 |
| | | | 324/72 |
| 2013/0073107 A1* | 3/2013 | Sawada | G06F 1/263 |
| | | | 700/297 |
| 2015/0353036 A1* | 12/2015 | Pierce | B60L 58/12 |
| | | | 307/9.1 |
| 2016/0107758 A1 | 4/2016 | Esteyne | |
| 2017/0373519 A1 | 12/2017 | Lei | |
| 2018/0013319 A1* | 1/2018 | Kanarellis | H02J 7/0024 |
| 2018/0054083 A1 | 2/2018 | Hick | |
| 2018/0351399 A1* | 12/2018 | Frey | H02J 9/061 |
| 2019/0013696 A1* | 1/2019 | Kanarellis | H02J 9/061 |

* cited by examiner

SYSTEM AND METHOD FOR SUPPLYING UNINTERRUPTIBLE POWER TO A POE DEVICE WITH A POWER SUPPLY INPUT FOR SOLAR POWER

CROSS-REFERENCE TO RELATED APPLICATIONS

The present application claims priority under 35 U.S.C. Section 120 from PCT Application Serial No. 16252365, filed on 18 Jan. 2019, entitled "SYSTEM AND METHOD FOR SUPPLYING UNINTERRUPTIBLE POWER TO A POE DEVICE WITH A POWER SUPPLY INPUT FOR SOLAR POWER". See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to system and method for supplying uninterruptible power to a Power-over-Ethernet (PoE) device. More particularly, the present invention relates to a system with a power supply input connected to a solar panel as a power supply.

2. Description of Related Art Including Information Disclosed Under 37 CFR 1.97 and 37 CFR 1.98

A "Power over Ethernet" powered device is a powered device that works on electrical power supplied by an Ethernet cable. Power over Ethernet ("PoE") describes a technique to deliver electrical power via Ethernet cabling. A single cable transmits data and electrical power to powered devices, such as IP security cameras, network webcams, wireless access points, VoIP phones, network routers and others. There is no need for a separate power source for the PoE powered device. IEEE PoE standards set signaling standards for power source equipment, the actual power source, and the powered device, so that the powered devices and power source equipment can communicate. The power source equipment and powered device detect each other and regulate the amount of power supplied to the PoE powered device. By IEEE PoE standards, there is only a limited power transmission available through an Ethernet cable.

An uninterruptible power supply ("UPS"), or uninterruptible power source, provides emergency power to a powered device when the main power source is disrupted. The UPS is an immediate and generally instantaneous alternative power supply available as soon as the main power source fails. In contrast, a standby or emergency system is a separate power source, which must be activated and then switched over to supply the powered device. The immediacy and lack of delay are important for sensitive electronic equipment and continuous data processing.

The UPS protects powered devices from loss of data, loss of status information related to the powered device, and the subsequent costs associated with repair and resetting of the powered device. Those extra costs avoided can include delays in data processing, sending technicians off site to the location of the powered device, and loss of revenue from downtime of the system. UPS also prevents disruption of the software of a powered device. An unexpected loss of power may necessitate a re-boot or restart of the system, causing more delay and downtime beyond the downtime caused by the disruption of power.

In the prior art, the UPS has been an alternate power switch, activated as soon as a power disruption is detected. A switch changes the regular power supply to an alternative power source, such as a battery. Critical devices, such as heart monitors and breathing machines in a hospital room, may cease to function with an unexpected loss of power. The UPS intervenes during these moments to eliminate all the associated equipment and network downtime.

Various patents and publications are available in the field of uninterruptible power supplies. United States Patent Application No. 2012/0080944, published by Recker, et al. on Apr. 5, 2012, discloses a method and system that, in relevant part, keep a lighting grid functional in the absence of power. An intelligent control device, a wall switch, for instance, and a lighting grid must be wired to communicate with each other and have individual battery backups. When the intelligent control device identifies a power outage, it communicates to those devices with their own backups on the grid to adjust to motion and environment, as well as to change intensity and color.

United States Patent Application No. 2009/0243391, published by Susong, III, et al. on Oct. 1, 2009, describes a power supply designed to provide power to networking utilities such as routers and switches. The power supply accepts alternating current, converts it to direct current, and powers at least one PoE port. The power source also includes an internal battery backup, and redundancies to make sure the power remains continuous. In order to provide continuous power, the device includes a failover communication interface between the main power supply and a backup source operating in an off-line mode. The failover interface detects when the main power source has been interrupted, at which time the backup source becomes the on-line source to provide power to the device.

U.S. Pat. No. 7,286,556, issued to Jackson on Oct. 23, 2007, discloses a system and method for delivering power to a number of devices attached to a central networking device. The central networking device delivers power over an Ethernet network, and can provide backup power to those devices on the network that would normally not warrant multiple redundant power sources. The system discloses delivery of power over a cable with different wires for data and power, or over the same cable using different frequencies and filters to maintain the integrity of the signals.

The prior art systems for providing UPS for a PoE powered device address the separation between the power source equipment and PoE powered devices and the further complication of the lack of an AC power supply, when the PoE powered devices are in remote locations. For example, remote network webcams connect by Ethernet cables for the power and data transmission to a control center. The remote network webcams can be located away from the regular power grid and standard AC power may not be available. The control center can also be located miles away and monitor multiple network webcams in other locations far and near. The prior art systems provide UPS for the control center as the power source equipment for the remote network webcams. The advanced prior art systems relate to prioritizing which PoE powered devices continue to receive power during an outage at the control center as the power source equipment.

However, not all remote network webcams can use the control center as power source equipment. Over long distances, the voltage necessary to transfer power and data from the control center to each remote network webcam is too high for Ethernet cables. The capacity of the Ethernet cable is insufficient to power remote PoE powered devices in many instances. Voltage drops or current fluctuations are created by resistance build-ups over lengthy power runs through Ethernet cables. Traditional PoE injectors overcome the long distance and Ethernet cable capacity issues. The PoE injector connects local AC power to the PoE powered device, concurrent with the data transmission between the control center and the PoE powered device. The prior art UPS systems for PoE powered devices do not address the injector-based systems for extensive and wide networks. Power disruptions at the local level of the injector and PoE powered device continue to affect systems with widespread PoE powered devices. A localized power outage can still disrupt PoE powered devices within an overall network, even as UPS prior art protects the control center. Prior art UPS systems have not yet addressed the expansion of PoE powered devices in wide and remote networks. The prior art UPS systems for PoE powered devices assume that the power source equipment is a sufficient alternate power source. That assumption is very limited to installations with the PoE powered device located in close proximity to a PoE power supply, such as the control center. For example, all of the IP phones in a call center are physically located close to the PoE power supply. Ethernet cable may be sufficient to power the IP phones as an alternative to regular AC power at the call center. Any power outage local to the call center will not affect the IP phones as the PoE powered devices.

The prior art UPS systems for PoE powered devices do not account for the variability in the power available from power source equipment in other situations. If the PoE powered devices are located far from the PoE power supply, the length of cable is not able to transfer sufficient power. Instead of an IP phone in a call center, a security camera at a remote location is very far from a PoE power supply. The amount of power from the nearest PoE power supply varies according to distance and cabling. Furthermore, since the prior art UPS systems for PoE powered devices provide no guidance for systems in which the power from the power source equipment is variable, there is absolutely no guidance for power management, when the power from the power source equipment is sure to provide insufficient power. A UPS for PoE powered devices without the PoE power as alternative power and the concurrent need to maintain the PoE connection for data, despite the lack of useable power is not disclosed.

Additionally, prior art PoE powered devices rely on passive injectors. The amount of power received from the PoE powered device is the amount of power received as a pass-through the available cables. There is no active management of the amount of power in order to support the PoE powered device. The system is limited to the length of cable between the power source equipment and the PoE powered device because the amount of power passed through controlled the power available to the PoE powered device. The systems with old cables and old power source equipment having previous PoE standards (such as IEEE 802.3af) would never be able to pass through sufficient power for the PoE powered devices that require the updated PoE standards, such as IEEE 802.3at. The account for technology upgrades to the physical constraints of the equipment, there is a need for a system to actively set the threshold for the output to the PoE powered device.

Further known mechanical limitations include the length of cable. The range of the network cannot be extended due to the inherent limitation of 100 m per segment of CAT-5 based Ethernet cables. There is a need to extend the range, while maintaining the 10/100/1000 base-T functionality. The PoE powered device must maintain connections from the control center of the network to the remote location of the system and from the location of the system to the PoE powered device.

The adjustment and extension of distance between the PoE powered device and the power source equipment with the PoE injector still does not address solar power as the main power supply input. The wire and cable issues of PoE powered devices are further complicated when solar panels power the overall system. The prior art PoE injectors rely on accessible AC power sources for the extension. AC power is used to overcome the wire and cable issues of PoE powered devices. When there is no AC power from an existing power grid, especially common in very remote locations, there must be another modification and further modification to account for the issues related to solar panels. Extending distance from the power source equipment to the PoE powered device has previously been disclosed for AC power and direct DC power, and those solutions rely on the availability of AC power and direct DC power as the norm. The alternative power supply, such as a battery, is an emergency option for when the regular AC power or direct DC power fails. Without AC power and without DC power, which is common in remote and isolated locations, there is a need to consider a solar panel array as the power supply input at the PoE powered device and how that limitation affects the other components of UPS for the PoE powered devices.

With solar power, there are already important considerations. Solar power is not consistent because the sun is not always shining. There are known methods to account for this nature of solar panel array operation. To get the most power from a solar panel under all conditions, which can change rapidly, due for instance, to a passing cloud, the load on the solar panel is adjusted so that the solar panel always operates at its Maximum Power Point (MPPT). To this end, a number of tracking (MPPT) methods have been developed as outlined below.

One conventional method is the "Perturb and Observe" method, wherein the controller makes a small change to the load and measures whether the power increases or decreases. If it increases, the next change is in the same direction. If it decreases, it is in the opposite direction. Also known as a "hill climbing" technique, the method is an algorithm that can become confused in rapidly changing conditions. The recovery time is a compromise between the size of the incremental change and the accuracy of the MPP tracking.

Too small a change will cause the system to have slow recovery. Too big a change will cause the system to oscillate about the maximum power point.

Another conventional method is called the Incremental Conductance method, which requires a little appreciation of calculus. The power is the voltage multiplied by the current. At maximum power, the rate of change of power with respect to voltage is zero. Hence:

$$\frac{d(VI)}{dV} = V\frac{dI}{dV} + I\frac{dV}{dV} = 0 \text{ so } \frac{dI}{dV} = -\frac{I}{V}$$

Thus when the incremental panel conductance and the panel conductance are equal and opposite, the panel is at maximum power.

This algorithm blows up when dV=0, so compromises need to be made to stop that happening.

Fractional Open Circuit Voltage is another method. The slope of voltage decrease under load is characterized empirically in advance. Current flow is periodically interrupted to measure the open circuit voltage, and a calculation is made of the maximum power point. This calculation is poor because the characterization drifts, and power is not continuous.

Fractional Short Circuit Current is a similar method to the above except short circuit current is used instead, and the panel periodically shorted. Also, the same disadvantage of a poor calculation due to the characterization drifting and the power not being continuous exists.

Other less conventional methods for managing power from a solar panel array are very computationally intensive and complex. There are advantages and disadvantages in all methods.

For the systems with UPS for PoE poweed devices, there are additional complications beyond the advantages and disadvantages of the two conventional methods for managing power from a solar panel array. In prior art systems for UPS for PoE powered devices, a power failure is an emergency condition. The power supply input as AC power or DC power is the main power, and the switch to an alternative power supply, such as a battery, is not normal. The alternative power supply is temporary, and the prior art systems switch back to the regular power supply input as soon as possible, when regular power is restored. The alternative power supply is passively maintained, such as batteries being charged, just in case of a power disruption. The power management and priority of the power supply input over the alternative power supply is stable. When the power supply input is a solar panel array, such as the power supply input in remote locations isolated from a power grid, the power supply input no longer has the same relationship to the alternative power supply. The stability and reliability of the power supply input as a solar panel array is no longer compatible with the prior art systems with UPS for PoE powered devices. With solar power as the main power supply input, the UPS for PoE powered devices must account for variability in both the available power from the main power supply input because of the sun and the available power from the PoE power supply being variable or virtually non-existent. Furthermore, the UPS for PoE powered devices must still maintain that PoE connectivity for heightened importance of the data transmission, despite the lack of useable power from that PoE connectivity.

It is an object of the present invention to provide embodiments of a system and method for supplying uninterruptible power to a PoE powered device.

It is an object of the present invention to provide embodiments of a system and method for managing power with a power supply input connected to a solar panel at a remote location.

It is another object of the present invention to provide embodiments of a system and method for regulating available power to the PoE powered devices and the alternative power supply based on a solar panel as the power supply connected to the power supply input.

It is another object of the present invention to provide embodiments of a system and method for regulating available power to the PoE powered devices and to charge the batteries of the alternative power supply based on a solar panel as the power supply connected to the power supply input.

It is still another object of the present invention to provide embodiments of a system and method for supplying uninterruptible power for more than one PoE powered device.

These and other objectives and advantages of the present invention will become apparent from a reading of the attached specifications and appended claims.

BRIEF SUMMARY OF THE INVENTION

Embodiments of the present invention include a system for supplying uninterruptible power for a Power over Ethernet (PoE) powered device. The system includes a housing, a power supply input being mounted on the housing and being connected to a solar panel as a power supply, a power source equipment input or main network input being mounted on the housing, a powered device output being mounted on the housing, an alternative power supply within the housing, and a control module within the housing. The control module connects the solar panel, the power supply input, the alternative power supply, and the power source equipment input to the powered device output in a relationship for uninterruptible power to the power device.

The power supply can be a solar panel or a plurality of solar panels in an array.

The alternative power supply can be comprised of a plurality of batteries, and the control module can include a plurality of battery chargers, so that each battery charger corresponds to respective battery. The battery and respective battery charger are connected in parallel so as to be charged with the available power from the solar panel array connected to the power supply input.

There is a panel irradiance sensor connected to the control module. The panel irradiance sensor is mounted near or adjacent to the solar panel array.

Embodiments of the present invention further include the control module being comprised of a power source equipment extension, a power management processor and a network management processor connected to the power management processor.

DETAILED DESCRIPTION OF THE INVENTION

Figure 1:
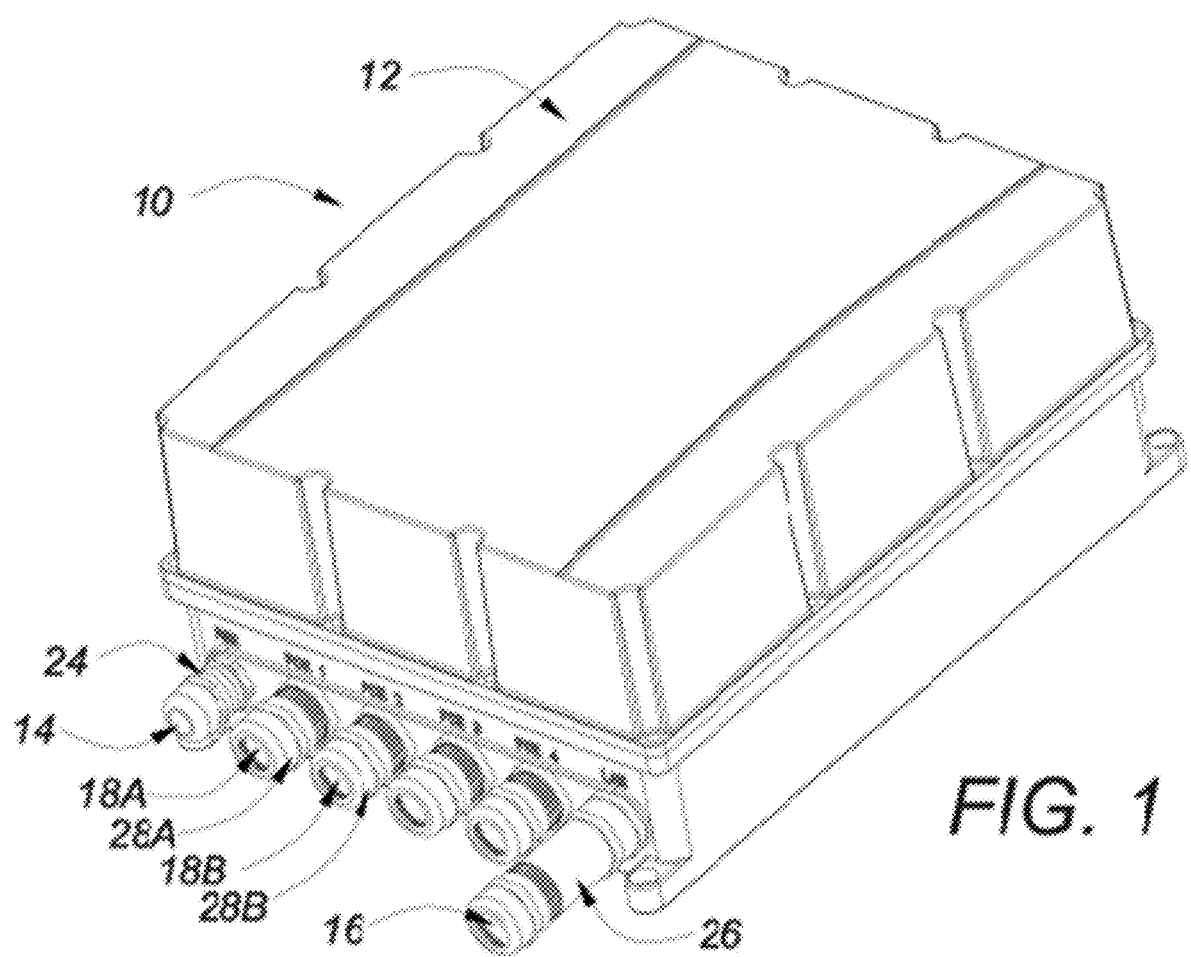
FIG. 1 is a perspective view of an embodiment of the system for supplying uninterruptible power, according to the present invention, showing relevant features to which reference will be made in the description.
Figure 2:
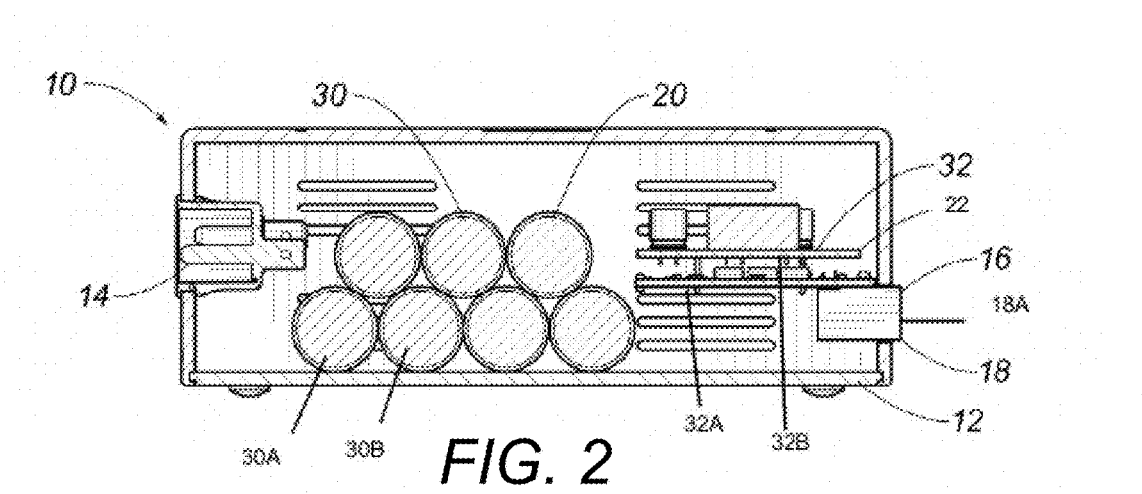
FIG. 2 is a cross-sectional schematic view of an embodiment of the system for supplying uninterruptible power, according to the present invention.
Figure 3:
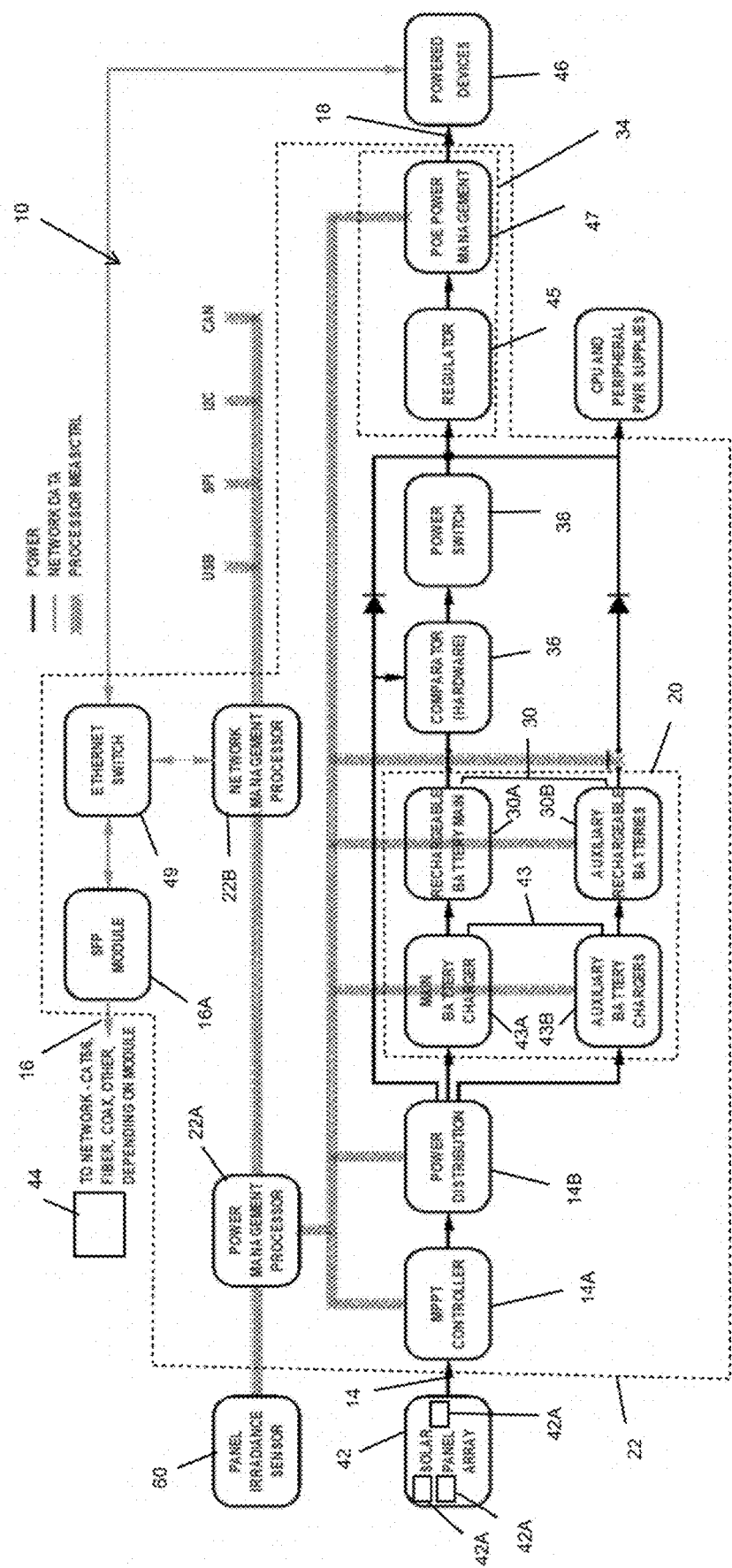
FIG. 3 is a schematic illustration of an embodiment of the system and method for supplying uninterruptible power to a PoE powered device with a solar panel array as the power supply, according to the present invention.

Referring to FIGS. 1-3, embodiments of the system 10 for supplying uninterruptible power are shown. The system 10 includes a housing 12, a power supply input 14, a power source equipment input or main network input 16, a powered device output 18, 18A, 18B, an alternative power supply 20, and a control module 22. FIG. 12 show the housing 12 as a separate unit for placement at a location of the PoE powered device or powered device 46. FIG. 3 shows a PoE powered device output 18 schematically for one PoE powered device 46. FIG. 1 shows PoE powered device outputs 18A, 18B for embodiments with more than one PoE powered device 46. The PoE powered device outputs 18A, 18B have corresponding powered device interfaces 28A, 28B. The PoE powered device 46 device can be remotely located from main network 44, such as a control center of an overall network of PoE devices, a network switch, and a switching hub. FIG. 3 shows the main network 44 connected to the main network input 16. In the prior art, the main network input was identified as the power source equipment input. In the prior art, the main network 44 was also power source equipment and related to the system as another source of power for power management. In the present invention, the main network 44 is identified for the data connectivity independent from power contributions for power management. The data connectivity may be wireless or wired by other network components, such as network switch or control center or network hub. The power supply for the main network 44 is separate from the power supply for each PoE powered device 46.

On the housing 12, the power supply input 14 is disposed with a Power Supply (PS) interface 24, as shown in FIGS. 1 and 2. The interface 24 is on an outside surface of the housing 12. The interface 24 is compatible as a connection for power supply 42 as solar panel array to the PoE powered device 46. FIGS. 1-3 show the main network input 16, and the powered device output 18 (FIG. 3) and the alternate embodiment of a first powered device output 18A and the second powered device output 18B disposed on the housing 12 for more than one PoE powered device 46. The main network input 16 has a main network interface 26. The first powered device output 18A has a first powered device (PD) interface 28A, and the second powered device (PD) output 18B has a second powered device interface 28B in FIG. 1. In embodiments of present invention, the PD interfaces 28A, 28B are Ethernet ports on the outside of the housing 12. Ethernet cables, such as CAT5, CAT6, fiber, coaxial or other, for data connect devices to the housing 12 through at least main network interface 26. Other embodiments include auxiliary power supply cable ports for either of the main network interface 26 or PD interfaces 28A, 28B. The main network 44 may include a PoE network switch, a non-PoE network switch, a computer network, and other power and data sources. The main network 44 is part of a data and power network. The main network 44 is not powered by the same power source as the system 10.

In the present invention, the powered device output 18 connects a PoE powered device 46 or PoE device to the system 10. The PoE powered device 46 becomes part of the overall network as well, with transmission of data and power between the PoE powered device 46 and the main network 44, such as a control center computer or a network switch. FIGS. 1-3 show the powered device output 18 for multiple powered devices 46. For example, the first powered device output 18A can connect to one powered device 46, and the second powered device output 18B can connect to another powered device 46. In the embodiments of FIGS. 1-3, the PoE powered device 46 is a PoE device, such as a wireless router, a network webcam, a voice over Internet Protocol (VoIP) telephone, a wireless access point, a camera, and a data processor. FIG. 3 shows a schematic illustration of the PoE powered device 46.

The control module 22 of the embodiments of the present invention is shown in FIG. 2 and FIG. 3 as disposed within the housing 12. The control module 22 connects the power supply input 14, the main network input 16, the powered device output 18, and the alternative power supply 20 into the system 10. The control module 22 manages the power and data received by the system 10 within the housing 12 and distributes data and power to through the powered device output 18 to at least one PoE powered device 46. The regulation of the power within the system 10 insures UPS to the PoE powered device 46, while also maintaining the data connection at the main network input 16. There is indirect connection of the system 10 between the main network 44 and the PoE powered devices 46, instead of a connection of the main network 44 directly to the PoE powered device 46. The buffering-like activity of the control module 22 preserves the PoE powered device 46 on the overall network in terms of data and power, regardless of distance from the main network 44 as any type of power source equipment, length of wire, quality of wire, quality of network. The control module 22 simultaneously allows for a local connection of another power source to the PoE powered device 46. UPS for a PoE powered device 46 is possible with the intervention of the system 10 of the present invention. The particular power regulation by the system 10 accounts for both data and power and further accounts for the complications of solar power with the arrangement and relationships between adapted components for UPS and solar power components. Prior art UPS for PoE devices and references do not contain the adaptations made for solar power as the power supply connected to the power supply input 14.

Embodiments of the system 10 in FIG. 3 include the control module 22 being comprised of an injector means 34, a comparator means 36 (hardware), a switch means or power switch 38, and a power source equipment extension or network extension switch 49. The control module 22 can be comprised of a printed circuit board (PCB) 32 as in FIG. 2. The PCB 32 is disposed within the housing 12 and can include a plurality of boards, including a motherboard 32A and at least one daughter board 32B. The components of the control module 22 can be distributed across the motherboard 32A and different daughter boards 32B.

The injector means 34 controls the power to the powered device 46 through the powered device output 18. Data and power are managed by the injector means 34 from the main network input 16, the power supply input 14, and the alternative power supply 20 to the powered device output 18. Embodiments of the present invention include an active injector means 34 being comprised of a regulator 45 and a power autonegotiation module or PoE Power Management module 47 in communication with the regulator 45. The regulator 45 connects the switch means 38 to the power autonegotiation module 47, and the power autonegotiation module 47 connects the regulator 45 to the powered device output 18. Previous embodiments have been classified as "passive injectors" with main network input as a power source equipment input determining the amount of power. The system 10 was a pass through for the available PoE power of power source equipment to the PoE powered device 46. In the present invention, auto-negotiation is performed so that the current PoE standard (IEEE 802.3at) can be made compatible with the previous PoE standard IEEE 802.3af. Older equipment and existing cabling can now accommodate the updated and more current PoE powered devices at the remote locations, including locations with only DC power by batteries or generators or solar panels. The PoE Power Management module or power autonegotiation module 47 can set a threshold for the PoE powered device regardless of whether the originating power source equipment or PSE as the main network complies with the current standard and upgrades. No matter which type of main network (CAT5/6, fiber, coaxial, etc.) as power source equipment is used, the system 10 will appropriately power the PoE powered device 46 to the required IEEE standards at the powered device output 18. The active injector means 34 connects the main network input 16 to the PoE powered device 46 so as to distribute data between the main network 44 and the PoE powered device 46. Additionally, the power autonegotiation module or PoE Power Management module 47 determines a predetermined amount of power for the powered device output 18 according to the PoE powered device 46. The regulator 45 activates the switch means 38 for the power sources providing the corresponding voltage to the powered device output 18 according to the predetermined amount of power.

Embodiments of the present invention include the comparator means 36 as hardware that detects power from the power supply input 14, the alternate power supply 20, and power to the powered device output 18. The comparator means 36 sets the relationship between the main network input 16, the power supply input 14, and the alternate power supply 20, to the switch means or power switch 38. The comparator means 36 monitors the amounts of power incoming for the PoE powered device 46. For UPS, the power to the powered device output 18 must be maintained for operation of the PoE powered device 46 without regard to the source and no longer related to the main network 44 as power source equipment contributing power, so that disrupted sources do not disrupt the power to the PoE powered device 46 and the data from the PoE powered device 46 to the main network 44. The switch means 38 can be a power switch and selects incoming power from either the power supply input 14 as determined by the comparator means 36 or the alternative power supply 20 as determined by the control module 22, the power supply 42 as a solar panel array, and the alternative power supply 20 for distribution. The switch means 38 enables UPS so that power through the powered device output 18 is stable for the PoE powered device 46.

According to the monitoring of the comparator means 36, the switch means 38 makes a particular connection between either the power supply input 14 or the alternative power supply 20 according to the regulator 45 commands to the switch means 38. The commands are set by the PoE Power Management module or power autonegotiation module 47 of the injector means 34. Without the main network input as power source equipment input, the data from the main network is maintained for the powered device output 18. The PoE power is actively monitored by the power autonegotiation module 47 to power the PoE powered device 46 efficiently by the power supply 42 as a solar panel array and the alternative power supply 20.

As shown in FIG. 3, the power supply 42 can be comprised of a single solar panel 42A or a plurality of solar panels 42A. The plurality of solar panels 42A can be arranged in an array. The present invention accounts for the remote location of the system 10, when conventional AC power sources, like wall sockets, are not available and convention DC power sources, like yet another set of batteries, are not available or practical. In the present invention, the solar panels 42A as the power supply 42 connected to the power supply input 14 is still local to the housing 12 and must be separate from the power source for the main network 44. The system 10 operates as a part of an overall network connected by data and power. The collection and transmission of data at remote locations, like at the system 10, are incorporated into the overall network. Power disruptions in one location and the additional power fluctuations due to weather and lighting conditions for the solar panels 42A will not crash the entire network. The system 10 of the present invention adds an uninterruptible power supply (UPS) to PoE powered devices for solar power as the main power supply. Previous systems only have the UPS at the control center level, as the power source equipment, to preserve data and avoid disruption. The present invention has UPS at the PoE powered device 46 level to account for the PoE powered devices 46 being remote from the control center. The system 10 of the present invention is compatible with solar panels 42A as the power supply 42 connected to the power supply input 14 that allows a separate UPS at the remote location of the housing 12 and PoE powered device 46.

The power supply 42 is now subject to the known problems of a solar panel array. The known UPS for PoE powered device system must be adjusted to overcome these problems. In the prior art, rapidly changing irradiance confuses the simple algorithm used to regulate the power from a solar panel. When the algorithm became confused in the "perturb and observe" method, the normal recourse is to start "climbing the hill" again from the bottom. The small incremental changes needed for good power point tracking mean that climbing the hill takes a relatively long time, and during this time the system is not optimized.

In one embodiment, the power supply input 14 is further comprised of a Maximum Power Point (MPPT) controller 14A and a power distribution unit 14B. The MPPT controller 14A connects the solar panels 42A to the power distribution unit 14B so as to determine an amount of power from the solar panels 42A as the power supply 42. The power distribution unit 14B connects the MPPT controller 14A to the injector means 34, the battery charger 43A, and another battery charger 43B or auxiliary battery charger so as to distribute the amount of power from the solar panel 42A, even though the amount of power is highly volatile and sure to fail, such as during night without any sunlight. The MPPT controller 14A is incorporated into the system 10 at the power supply input 14 and before the comparator means 36 and switch means 38 of the control module 22. The solar panels 42A are isolated from the main network 44. The system 10 stabilizes the data and power flow despite the instability of the solar panels 42A as the power supply 42. The present invention is a sequential relationship and the isolation of the main network 44 from the solar panels 42A, which protects data and network flow.

In another embodiment, for the solar panels 42A to be incorporated into a system 10 with UPS for PoE powered devices, the system 10 further includes a panel irradiance sensor 60. The panel irradiance sensor 60 is comprised of a small sensor, strategically placed on a solar panel 42A, with a similar spectral response to the solar panel 42A in the array itself. The panel irradiance sensor 60 modifies the prior art method by making different adjustments to the power supplied by the solar panels 42A. That is, the present method of the invention places the system 10 on the hill from which to climb, which is closer to the top. The real time radiance data from the panel irradiance sensor 60, in conjunctions with the MMPT controller 14A of the modified power supply input 14 connects to the control module 22 so as to further reduce the stabilization time, and the consequent power loss, by approximately an order of magnitude. In some embodiment, the panel irradiance sensor 60 is connected to the power management processor 22A. Instead of the conventional methods used to estimate the time and interval, when the system needs to be reset, the panel irradiance sensor 60 provides the real time and interval when the system needs to be reset. The corrections and steps "up the hill" are no longer projections and estimates for recovery, but rather exact modifications based on real time data.

The present invention further includes a different relationship between the power supply input 14 and the alternative power supply 20. There is still a load that needs to be powered, a source of power being batteries (the alternative power source 20), and another source of power being the power supply 42 connected to the power supply input 14 of the present invention. In the prior art, with AC power connected to the power supply input 14, the presence of AC power is considered the norm. AC power is used to power the load for the powered PoE device 46 and maintain the batteries 30 of the alternative power supply 20. In the event of AC power loss, the batteries of the alternative power supply 20 take over to power the load of the PoE device 46. When AC power returns, the system reverts back to the AC power connected to the power supply input 14.

While the presence of light from the sun is also considered the norm, the absence of light is also a regular occurrence. Unlike the prior art systems with AC power or even DC power connected to the power supply input 14, there is going to be a known and regular power failure. During the hours of daylight, the amount of solar energy reaching the surface of the Earth is variable and unpredictable in most climates, except in the broadest of terms. There is no guarantee that the amount of incident solar energy will be even close to enough to power anything but the lightest load. Furthermore, during the night, there is zero solar energy, since the sun is on the other side of the planet. Solar power alone is a totally impracticable solution to continuously power anything, especially not a system with UPS, which is supposed to have continuous and reliable power.

In still another embodiment of the present invention, the system 10 and method includes modifications to the alternative power supply 20 and the control module 22 so as to provide power to the PoE powered device 46 with UPS based on solar panels 42A. The alternative power supply 20 is comprised of a plurality of batteries 30, and the control module 22 is comprised of a plurality of battery chargers 43. Each battery 30 is rechargeable and has a corresponding battery charger 43 on the control module 22. Each battery charger 43 is also connected to the power distribution unit 14B. Each battery 30 and a corresponding battery charger 43 are connected in parallel to the power distribution unit 14B and the injector means 34. In some embodiments, a battery 30 of the alternative power supply 20 is a lithium ion battery. FIG. 2 and FIG. 3 show the embodiments of the alternative power supply 20 disposed within the housing 12. The batteries 30 of the alternative power supply 20 are considered as the main or primary source of power for the PoE powered device 46, even with power supply 42 being at least a solar panel 42A.

In yet another embodiment, the main network input 16 is comprised of an SFP module 16A or Small Form-factor Pluggable module and the control module 22 is further comprised of a power management processor 22A and a network management processor 22B. The SFP module 16A is compatible with a network and a network cable with at least one network input and network output so as to provide data from the main network 44 to the main network input 16. The SFP module 16A is an adapter for hardware, including but not limited to network connection, an Ethernet cable, such as CAT 3, CAT5, and CAT6, fiber-optic cable, coaxial cable or other device for data transmission back and forth. The network connection transmits and receives data through the main network input 16 to the control module 22 and to the PoE powered device 46. The network management processor 22B connects to the network switch extension 49 or ethernet switch of the control module so as to provide higher level network functionality and connects to the power management processor 22A. The power management processor 22A connects the control module 22 to the SFP module 16A so as to control power flow from the power supply input 14 and the alternative power supply 20, according to the available power. The system 10 is set to monitor and account for any power by adjusting load on the other power sources, the power supply input 14 and the alternative power supply 20.

The PoE device still relies on the data transmission back and forth through the network from the control center as the main network 44. No power from the control center or from intervening power source equipment is transmitted by Ethernet cabling to the PoE powered device. Because of the physical restraints of Ethernet cabling and distances involved, no useful power can be transmitted to the system 10 for PoE powered devices 46 remote from the main network 44 or network components. The Ethernet cabling engages the main network input 16, supplying data. The main network equipment input 16 depends on the module, such as CAT5/6, fiber, coaxial or other network cable. The main network 44 connects to the main network input 16 with an SFP module 16A connected to the ethernet switch or network switch extension 49, the network management processor 22B, and the power management processor 22A through the network management processor 22B. Both the power management processor 22A and the network management processor 22B connect the data and the power to the system 10.

The bifurcation into the power management processor 22A and the network management processor 22B from one processor of the prior art allows non-ethernet interfaces, such as battery management, to be separated from the higher level data and PoE power on the network. In the present invention, the network management processor 22B, the network switch extension 49 or Ethernet switch and SFP module 16A can be located on a daughter board 32B. As external main network 44 upgrades, the control module 22 can replace these components without replacing the entire control module 22. Additionally, In the prior art systems, there is only one processor for the power, the switch, and the data, and this one processor also controls the battery management system with connections to the battery chargers. At this level, the control of the network switch extension or Ethernet switch is a relatively simple on and off for network connectivity. The prior art processor is only connected to the Ethernet switch for the battery management system. However, the network connectivity is no longer so simple to manage. There are levels of routing control, security, and data connectivity that are sometimes more important than the power! In modern systems, the data is more important than the power, so a full processor is needed, instead of only an Ethernet switch to turn data on and off.

In the present invention, this bifurcation is disclosed with a separation of duties and connections for the network management processor 22B connected to the network switch extension 49 or Ethernet switch and the PoE power management module 47 through the power management processor 22A. There is a bypass over the solar panel 42A irregularities and power management. The power management processor 22A connects the MPPT controller 14A, power distribution unit 14B, the comparator means 36, and the PoE Power management module for the battery management system. The network related functions of the network management processor 22B are still incorporated into the power source equipment 44, but at a level separate from battery management and solar power management.

The network management processor 22B manages the data from the network connection into the system 10. The intervening equipment of the main network 44 can be a router or network switch or Ethernet switch. The PoE powered device 46 is still required to source power from a more local source, while still transmitting and receiving data through the powered device output 18 and the main network input 16. Ethernet cabling originating from the main network as power source equipment, such as a control center, can connect to the main network input 16, which connects the system 10 into the overall network of data, even though the main network is no longer related to the PoE powered device 46 as power source equipment.

Embodiments of the present invention include the method of supplying uninterruptible power with the power supply input 14 connected to a solar panel 42A. The connections and sequence of components allow for the particular method to be performed. The solar energy from the solar panel 42A is used as efficiently as possible to gather enough energy during daylight hours to run the load continuously through the batteries 30. In particular, the method of the present invention includes the step of collecting solar energy through the solar panel 42A for a given period, such as one year for a good, slow-moving average, one month for a faster moving average, one week as an even faster moving average, and one day as a selected average. In the present invention, the given period is one day because the other periods encounter the problems of storing the energy to compensate for seasonal variations, having adequate storage capacity in most climates, maintaining continuous power requirements of current real-world loads, and being unacceptably bulky and costly to store energy for a given period longer than one day. Future technical advances may affect the cost efficiency for these larger amounts of energy storage. As such, in a preferred embodiment, a complete 24-hour day is a given period so as to account for local seasonal solar irradiance and a safety margin to compensate for daily variations.

The method further includes the step of assembling the system 10 with the alternative power supply 20 being comprised of a plurality of batteries 30 and the control module 22 being comprised of a plurality of battery chargers 32, wherein each battery 30 corresponds to a respective battery charger 32 in series with the power distribution unit 14B and the injector means 34. The solar panel 42A is connected to the power supply input 14, and the solar panel 42A is the power supply 42. Then, a predetermined amount of voltage to the powered device output 18 is set with the PoE power management module 47, while solar energy as power is collected through the solar panel 42A for the given period.

Embodiments of the method include the steps of supplying power from a battery 30A of the plurality of batteries 30 to the powered device 46 through the regulator 45 of the injector means 34 and supplying power from the power supply input 14 to a battery charger 32A of the plurality of battery chargers 32 corresponding to the battery 30A of the plurality of batteries 30 so as to recharge the battery 30A of the plurality of batteries 30. The solar power recharges the one battery 30A as the active battery supporting the load of the powered device 46. The solar power is not necessarily the primary power source, like the AC power or DC power of the prior art UPS for PoE powered devices. The solar power is different from the consistency of AC power or DC power from conventional power supplies, but the system 10 now manages both the reduction of the volatility of solar power and incorporation of the less consistent solar power for uninterruptible power. There is a double compensation for the nature of solar power being subject to weather and environment and being subject to constraints of UPS. The method of the present invention enables the load to be supported consistently by the battery 30A, not the power supply 42.

The method further includes the steps of detecting insufficient power at the injector means 34 by the PoE power management module 47, and activating the regulator 45 to collect power for the powered device output 18 from another battery 30B of the plurality of batteries 30. Sufficient power from the another battery 30B is detected with the regulator 45, and the power to the powered device output 18 is switched from the battery 30A to the another battery 30B. Also, the power from the power supply input 14 is now supplied to another battery charger 43B of the plurality of battery chargers 43 corresponding to the another battery 30B of the plurality of batteries 30 so as to recharge the another battery 30B of the plurality of batteries 30, after the step of switching. Any power disruption is a double switch, when a power drop is detected. A new battery and corresponding battery charger are switched, so that the solar power is used to save as many batteries as possible in the fully charged state.

In another embodiment of the method, all of the other batteries 30B can be fully charged, and the one battery 30A is being re-charged simultaneous with powering the powered device 46. Thus, the method can include supplying power from the power supply input 14 to the powered device 46 through the regulator 45 of the injector means 34. When other batteries 30B of the plurality of batteries 30 are fully charged and the battery 30A is being re-charged, then any excess power from the solar panel 42A can now be used for the powered device 46. The PoE Power management module 47 performs the negotiation of any power from the power source equipment input 16, the battery 30A, and the power supply input 14. In this method, the volatility of the solar panel 42A is removed from the power source equipment output 18. There is only a direct connection to the solar panel 42A, when all other batteries 30B are fully charged and the active battery 30A is also being re-charged to stay full. There is no failure and switch relationship between the solar panel 42A as the power supply 42 and the regulator 45, the comparator means 36, and the switch means 38. The UPS is based on the battery 30A maintaining the sufficient voltage and only using power from the solar panel 42A, when all other batteries 30B are fully charged. The injector means 34 only connects the solar panels 42A to the powered device 46 for power, when one battery 30A is also connected to the solar panels 42A.

In still another embodiment of the invention, the method of the present invention includes re-charging the battery 30A, after the battery 30A is drained and the system 10 has switched to another battery 30B. The method further includes the step of supplying power from the power supply input 14 to the battery charger 43A corresponding to the battery 30A of the plurality of batteries 30 so as to recharge the battery 30A of the plurality of batteries 30, after the step of switching power and concurrent with the step of supplying power from the power supply input 14 to the another battery charger 43B. Due to the nature of the battery technology, such as a lithium ion type battery, the charging should always be on a "per battery" basis, even if there are multiple batteries that need charging. Due to the nature of battery chemistry and for safety reasons, charge rates are limited, implying a minimum time to charge. Without this feature it would not be possible to guarantee that each battery could be fully charged during a one day period.

With limited time and access to sunlight, the supplying power from the power supply input 14 must be concurrent to the components connected and requiring a load. The parallel relationship of plurality of batteries 30 and respective plurality of battery chargers 43 between the power distribution unit 14B and the injector means 34 supports the method. The step of supplying power from the power supply input 14 to the battery charger 43A corresponding to the battery 30A of the plurality of batteries 30 recharges the battery 30A of the plurality of batteries 30 in parallel with the step of supplying power from the power supply input 14 to the another battery charger 43B.

In yet another embodiment of the invention, the method of the present invention includes simultaneously re-charging any empty battery of the plurality of batteries 30, when re-charging the battery 30A, after the battery 30A is drained and when the system 10 has switched to another battery 30B. The charging remains parallel, when multiple batteries that need charging. With limited time and access to sunlight, the supplying power from the power supply input 14 must be concurrent to the components connected and requiring a load. The parallel relationship of plurality of batteries 30 and respective plurality of battery chargers 43 between the power distribution unit 14B and the injector means 34 supports this embodiment of the method as well. The step of supplying power from the power supply input 14 to any battery charger 43 corresponding to any battery 30 without a full charge recharges all batteries 30 in parallel with the step of supplying power from the power supply input 14 to the another battery charger 43B.

When the system 10 further comprises a panel irradiance sensor 60 in communication with the control module 22 and mounted with the solar panel 42A, the method of the invention further comprises the step of: connecting the panel irradiance sensor 60 to the control module 22, and regulating the step of supplying power from the power supply input 14 to a battery charger 43A corresponding to the battery 30A of the plurality of batteries 30 so as to recharge the battery 30A of the plurality of batteries 30, according to the panel irradiance sensor 60. In this embodiment, correction of the volatility of the solar panel 42A is performed with the panel irradiance sensor 60. The panel irradiance sensor 60 can be connected to the power management processor 22A of the control module 22.

The present invention provides a system and method for supplying uninterruptible power to a PoE powered device. The system and method for managing power from a power supply input connected to a solar panel allows for the extended range of PoE powered devices with UPS in remote locations. The problems of solar panels directly teach against the consistency and reliability required for uninterruptible power supply systems. The present invention modifies the components and relationships between components to provide the UPS. There are two levels of compensation related to the nature of solar power and the constraints of UPS. The switch during "outages" are triggered by batteries running low, not actual unexpected and unpredictable power disruptions of the power supply. There is no catastrophic event for a power failure in relation to the switch and the power supply. Furthermore, the switch is a switch from battery to battery, and there is a double switch for the power supply input to the battery charger corresponding to the drained battery. The availability of AC power and the limited capacity of a battery for DC power were limitations that restricted powered devices to developed areas and particular storage capacities. The present invention incorporates the solar power at the power supply input, so the storage capacity of a regular DC battery is no longer a limitation, and the PoE powered device can be even more isolated and remote under the constraints of UPS. The system can still power devices and charge the batteries with UPS, with a parallel relationship between batteries. The adjustments and new components, like the panel irradiance sensor provide a system and method for supplying uninterruptible power for more than one powered device when the power supply input is connected to a solar panel.

The foregoing disclosure and description of the invention is illustrative and explanatory thereof. Various changes in the details of the illustrated structures, construction and method can be made without departing from the true spirit of the invention.

We claim:

1. A system for supplying uninterruptible power, comprising:
   a housing;
   a power supply input disposed within said housing, said power supply input having a power source interface on an outside of said housing;
   a main network input disposed within said housing, said main network input having a main network interface on said outside of said housing;
   a powered device output disposed within said housing, said powered device output having a powered device interface on said outside of said housing;
   an alternative power supply disposed within said housing;
   a power supply connected to said power supply input, said power supply being comprised of a solar panel:
   a powered device connected to said powered device output by an Ethernet cable;
   a main network connected to said main network input, said main network being powered separate from said power supply input and said alternative power supply; and
   a control module connected to said power supply input, said main network input, said powered device output, and said alternative power supply,
   wherein said control module comprises an injector means, a comparator means, a switch means, and a network extension switch between said powered device and said main network input so as to organize and prioritize network data packet transfers from and to said main network and said powered device, said comparator means detecting power from said power supply input and to said powered device output and connecting said main network input, each battery, and said power supply input to said switch means, said switch means connecting said comparator means and said alternative power supply to said injector means, said injector means collecting and distributing power, said injector means being comprised of a regulator and Power over Ethernet (PoE) power management processor, said regulator connecting said switch means to said PoE power management processor, said POE power management processor connecting said regulator to said powered device output, wherein said power supply input is further comprised of a Maximum Power Point Tracker (MPPT) controller and a power distribution connector, said MPPT controller connecting said solar panel to said power distribution connector so as to determine an amount of power from said solar panel, said power distribution connector connecting said MPPT controller to said injector means, a battery charger, and another battery charger so as to distribute said amount of power from said solar panel, wherein said control module is further comprised of a power management processor, and a network management processor, said network management processor connecting to said power management processor, and wherein said power management processor is connected to said main network input through said network management processor so as to control power flow from only said power supply input and said alternative power supply to said powered device and to control network data packet transfers only from said main network input through said network extension switch to said powered device according to said network management processor, and said network management processor is configured to be replaced without replacing said power management processor.

2. The system for supplying uninterruptible power, according to claim 1,
wherein said power supply is comprised of a plurality of solar panels.

3. The system for supplying uninterruptible power, according to claim 2,
wherein said plurality of panels are arranged in an array.

4. The system for supplying uninterruptible power, according to claim 1,
wherein said alternative power supply is comprised of a plurality of batteries, each battery being rechargeable,
wherein said control module is comprised of a plurality of battery chargers, each battery charger corresponding to each battery, and
wherein each battery charger is connected to said power distribution connector, each battery and a corresponding battery charger being connected in series to said power distribution unit and said injector means.

5. The system for supplying uninterruptible power, according to claim 1, further comprising:
a panel irradiance sensor being in communication with said control module and being mounted with said solar panel.

6. The system for supplying uninterruptible power, according to claim 1,
wherein said main network input is further comprised of a Small Form-factor Pluggable (SFP) module, and
wherein said SFP module connects said main network to said network management processor and said network switch extension,
said network management processor connecting to said network switch extension so as to provide network functionality, and
said power management processor being connected to said main network input and said SFP module through said network management processor so as to control power flow only from said power supply input and said alternative power supply to said powered device and to control said network data packet transfers only from said main network input through said SFP module and said network extension switch to said powered device according to said network management processor.

7. The system for supplying uninterruptible power, according to claim 6,
wherein said SFP module is comprised of an adapter for hardware.

8. The system for supplying uninterruptible power, according to claim 7,
wherein said adapter is selected from a group consisting of a network cable adapter, an Ethernet cable adapter, a fiber-optic adapter, a co-axial cable adapter, and a CAT3/5/6 cable adapter.

9. The system for supplying uninterruptible power, according to claim 1,
wherein said network switch extension is comprised of an Ethernet switch.

* * * * *